United States Patent [19]

DeMesa, III et al.

[11] 4,281,380
[45] Jul. 28, 1981

[54] BUS COLLISION AVOIDANCE SYSTEM FOR DISTRIBUTED NETWORK DATA PROCESSING COMMUNICATIONS SYSTEM

[75] Inventors: Nicanor P. DeMesa, III; John E. Laabs, both of North Stonington, Conn.

[73] Assignee: Harris Corporation, Melbourne, Fla.

[21] Appl. No.: 973,684

[22] Filed: Dec. 27, 1978

[51] Int. Cl.³ .................. G06F 15/16; H04Q 3/00; H04J 3/00
[52] U.S. Cl. .................. 364/200; 340/147 LP; 370/94
[58] Field of Search ... 364/200 MS File, 900 MS File, 364/200, 900; 340/147 LP, 163, 346, 147 R; 178/58 A; 325/22

[56] References Cited

U.S. PATENT DOCUMENTS

| | | | |
|---|---|---|---|
| 3,445,822 | 5/1969 | Driscoll | 364/200 |
| 3,470,542 | 9/1969 | Trantanella | 364/200 X |
| 3,825,897 | 7/1974 | Lawton | 340/147 LP |
| 3,978,451 | 8/1976 | Ito et al. | 340/147 LP |
| 4,017,841 | 4/1977 | Jensen | 364/900 |
| 4,038,644 | 7/1977 | Duke et al. | 364/900 |
| 4,050,097 | 9/1977 | Miu et al. | 364/200 |
| 4,063,220 | 12/1977 | Metcalfe et al. | 340/147 LP |
| 4,120,029 | 10/1978 | Steiner | 364/200 |

OTHER PUBLICATIONS

Metcalfe, R. M. and Boggs, D. R., "Ethernet: Distributed Packet Switching for Local Computer Networks," *Comm. ACM,* vol. 19, No. 7, Jul. 1976, pp. 395–403.

*Primary Examiner*—Raulfe B. Zache
*Attorney, Agent, or Firm*—Craig and Antonelli

[57] ABSTRACT

A transmission collision avoidance scheme for a distributed network data processing communication system including a half-duplex communication board coupled to the system bus. In addition to a serial data bus and a clock bus, the system bus is configured to include a busy status line that is monitored by each device connected in the system. When a device desires to send a message, it initially proceeds to busy out the busy status line, by causing a busy flag to be placed on the line. It also checks the busy status line in order to ascertain whether a busy flag was already set, namely, whether another device has already requested service. If the bus is busy, the device cannot transmit until the bus becomes free and the requesting device resets the bus busy flag for a retry interval. Assuming that the bus is free, the transmitting device proceeds to transmit. When the device for whom the message is intended receives the message, it sends an acknowledgement message back to the transmitting device, signifying a successful transmission.

Because of circuit operation and propagation delays, there exists the possibility of more than one device setting a busy flag and checking the status of the bus without being aware that another device is simultaneously requesting use of the bus. In this event, a transmission collision will occur, so that the intended receivers see no sensible transmission and, consequently, return no acknowledgement messages to the collision-participating transmitters. When a transmitter fails to receive an acknowledgement message, it assumes that a collision has occurred, and proceeds to repeat the above procedure for transmitting its message pursuant to a prescribed priority scheme, the higher priority device being assured of transmitting its message without a collision on the bus with a message from the lower priority device.

39 Claims, 7 Drawing Figures

BUS COLLISION AVOIDANCE SYSTEM FOR DISTRIBUTED NETWORK DATA PROCESSING COMMUNICATIONS SYSTEM

FIELD OF THE INVENTION

The present invention relates to communication systems, and is particularly directed to a scheme for preventing and circomventing the collision of a plurality of message transmissions along a distributed network data processing communication system.

BACKGROUND OF THE INVENTION

Concomitant with the development of high speed digital data processing systems has been the need for intercomponent communication schemes by way of which each of the components that make up an overall system may communicate with one another. One of the present trends in digital communication systems is the use of a distributed network communication system. Typically, a distributed communication network contains a bus over which data, clock, and control signals are conveyed, commonly shared by each component of the system. Through appropriate bus communication interface or adapter units located between a system device (usually including a CPU) and the shared bus, messages are buffered, transmitted, and received.

Within such a digital communication system, messages may be transmitted in a synchronous manner, as by way of a prescribed TDM transmission scheme, or asynchronously, usually on a first come-first served/priority basis. The former approach is usually implemented to afford each device an opportunity to send a message within a recurring transmission time slot. A major drawback to this scheme, however, it its inefficiency, since not all devices may desire to transmit and, as a result, the bus is wastefully tied-up by idle time slots. The asynchronous approach seeks to obviate this drawback by awarding bus occupancy time on the basis of need (to communicate) so that the operational capacity of the bus may be maximized. In order to accomplish this objective, however, some means must be provided to ensure that only a single device may transmit at a time; otherwise, transmissions from plural devices would interfere with one another, or collide, and thereby prevent the successful completion of any intended communication.

For this purpose, there have been developed, in the prior art, schemes for effectively examining the communication link to the intended receiver to determine whether or not the link is busy, namely, whether or not the transmission of a communication to another device would be successful. For example, in the U.S. Pat. No. to Miu et al 4,050,097, there is described a bus communication system in which seizure of a bus by more than one device distributed along the bus is prevented by a priority lockout scheme. In accordance with this patented system, each device that may communicate is assigned a priority. When any device desires to communicate with another device, it requests that the bus be granted to it by way of a bus request signal sent over a bus request line. If no other device wishes to transmit, then the requesting device is granted use of the bus, all other devices being prevented from sending messages or being locked-out for the duration of the communication. Should more than one device attempt to use the bus at the same time, by virtue of an established priority scheme, that includes substantial priority assignment hardware, only the device having the higher priority is granted immediate use of the bus, with lower priority devices having to wait their turn. In effect, through separate fixed priority connections and logic, the patented system always effects a housekeeping routine of prioritizing transmission requests and assigning the order of use of the bus before each message is sent. Therefore, while this approach provides a safeguard against collisions, it requires substantial lockout circuitry and the elapse of a prescribed pretransmission wait time for each message sent.

In the U.S. Pat. No. to Duke et al 4,038,644, there is described a processor communication system in which there is a separate bus adapter for each unit, with an individual bus busy line associated with every adapter. When one of the units wishes to communicate with another unit, it sends a request to the local bus adapter of the receiving unit to determine whether or not the receiver unit is busy. If the receiver is not busy, a busy identification flag is set on the busy line of the receiver unit, informing the receiver that a message will be sent to it from the transmitter and also informing all other devices connected to the bus that they cannot presently communicate with the receiver (since a transmission is presently being prepared to be sent to it). Each bus adapter is assigned a priority in the system, similar to the system of Miu et al, discussed above, and the priority scheme is used to prevent simultaneous seizure.

The U.S. Pat. No. to Driscoll 3,445,822 describes a common bus interconnection network in which any device may seize the bus to communicate with another device. Prior to Seizure of the bus, however, each unit generates a seizure code, which is compared with a prescribed code to determine whether or not the bus is available. If the two codes do not coincide, the requesting device is informed that another unit is attempting to seize the bus and that the device must wait until a match occurs.

In each of the above-described prior art systems the collision avoidance schemes are complex, requiring a substantial amount of hardware, and the bus interface communication units are required to perform a significant amount of housekeeping and transmission preparation tasks before a message is actually sent. As a result, use of the bus is delayed and the efficiency of the system is decreased.

As opposed to the strict collision avoidance systems, as described above, there have also been developed schemes which, after a brief check of the bus, operate to immediately send a message over the bus, if the bus has not already been seized, but which permit collisions to occur, necessitating a retransmission. Such systems are described in the publications: "Ethernet: Distributed Packet Switching for Local Computer Networks" by R. M. Metcalfe et al, Communications of the ACM, July 1976, Vol. 19, No. 7, pages 395–403, and an article entitled "Acknowledging Ethernet" by M. Tokoro et al, pages 320–325. Basically, in accordance with an "Ethernet" type of scheme, the bus is checked for busy status prior to each transmission. Assuming the bus is quiet, then after a brief wait interval, if the bus is still quiet, a message, or data packet, is transmitted. If the message collides with another packet, retransmission is carried out according to a prescribed collision control algorithm. In order to detect the occurrence of a collision, each transceiver contains an interference detector. The interference detector monitors the bus and compares what is sees to what its device is supposed to be transmitting. A difference in the bit values of the two quantities, representative of a collision, causes the transmitter to truncate its message and temporarily jam the bus, thereby informing the other participants in the collision of the interference. A transmitting device recovers from a detected collision by aborting the transmission and retransmitting the message after a prescribed dynamically chosen random time period. Thus, as compared to the previously described prior art apparatus, an "Ethernet" type of bus collision scheme attempts to be more efficient by compromising between pretransmission housekeeping and the need to retransmit. However, in so doing, the system employs a bus collision monitor that adds to the complexity of the full duplex "Ethernet" scheme.

SUMMARY OF THE INVENTION

In accordance with the present invention, there is provided a bus collision avoidance scheme that improves upon the above-characterized Ethernet system by the use of a considerably simplified communication and bus monitoring arrangement, and through a retransmission technique that establishes a retransmission priority among the collision participants, to thereby increase the efficiency of use of the bus.

To this end, in accordance with the present invention, which is incorporated in a half-duplex system, in addition to a serial data bus and a clock bus, the system bus is configured to include a busy status line that is monitored by each device connected in the system. When a device desires to send a message, it initially proceeds to busy out the busy status line, by causing a busy flag to be placed on the line. It also checks the busy status line in order to ascertain whether a busy flag was already set, namely, whether another device has already requested service. If the bus is busy, the device cannot transmit until the bus becomes free and the requesting device resets the bus busy flag for a retry interval. Assuming that the bus is free, the transmitting device proceeds to transmit. When the device for whom the message is intended receives the message, it sends an acknowledgement message back to the transmitting device, signifying a successful transmission.

Because of circuit operation and propagation delays, there exists the possibility of more than one device setting a busy flag and checking the status of the bus without being aware that another device is simultaneously requesting use of the bus. In this event, once setting the busy busy flag and then finding the bus free, each such device will then proceed to send its message, causing a transmission collision. Since the transmissions collide, the resulting message on the bus becomes garbled, so that the intended receivers see no sensible transmission and, consequently, return no acknowledgement messages to the collision-participating transmitters. When a transmitter fails to receive an acknowledgement message, it assumes that a collision has occurred and proceeds to repeat the above procedure for transmitting its message pursuant to a prescribed priority scheme. This priority scheme is preestablished among the participants along the bus and prevents a retransmission among the participants of the original collision. This stored priority scheme automatically enables a relatively higher priority device to seize the bus to the exclusion of its previous collision coparticipant(s). As a result, between the participants of the original transmission collision, the higher priority device will be caused to set its busy flag on the bus status line before the lower priority device and sufficiently in advance of the other participant, so that the lower priority device will see that the bus is already seized by the first participant when it checks the bus status line. Therefore, the higher priority device can be assured of transmitting its message without a collision on the bus with a message from the lower priority device.

DETAILED DESCRIPTION

Before describing, in detail, the particular improved message collision avoidance scheme in accordance with the present invention, it should be observed that the present invention resides primarily in a novel structural combination of conventional computer components and communication circuits, and not in the particular detailed configurations thereof. Accordingly, the structure, control, and arrangement of these conventional components and circuits have, for the most part, been illustrated in the drawings by readily understandable block representations and schematic diagrams, which show only those specific details that are pertinent to the present invention, in order not to obscure the disclosure with structural details which will be readily apparent to those skilled in the art having the benefit of the description herein. In addition, various portions of an electronic data processing system have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

Figure 1:
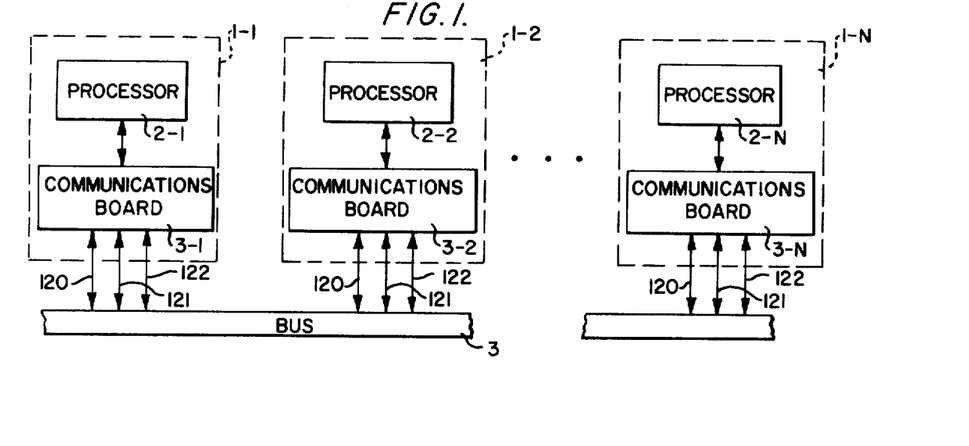
FIG. 1 is a generalized block diagram of a distributed network communication system showing the interconnection arrangement of an individual communication board and its attendant processor to the network bus.

Referring to FIG. 1 of the drawings, there is shown a block diagram of pertinent portions of a distributed communication network over which a plurality of devices 1-1 through 1-N communicate with one another. Each of devices 1-1 through 1-N is processor or computer-based and is coupled with suitable peripheral I/O interphase units (not shown), where appropriate, for inputting and outputting data and control signals as necessary for conducting the operation of the particular system in which the distributed communication network is employed. For example, in a monetary transaction environment, these I/O interphase units may be coupled to suitable displays, cash drawers, credit card readers, keyboards, printers, etc. Similarly, in larger, industrial scale environments, such as a printing press control system, these units may involve preset ink modules, print units, disk units, remote entry consoles, displays, keyboards, etc., which communicate with one another during the operation of the overall system. Of course, it is to be understood that the present invention is not limited to these or any particular environment, but is applicable, in general, to all processor-based digital communication systems. Therefore, no particular environment or peripheral device has been illustrated, so that full appreciation and understanding of the invention will not be obscured.

Each device 1-1 through 1-N (in addition to the above-described I/0 signal coupling components, not shown) includes a suitable processor or computer 2-a with necessary memory, and a communication board (sometimes termed a bus adapter) 3-i. Each processor 2-i supplies suitable information signals, including address, data, and control signals, to its associated communication board 3-i, for assembling and transmitting-/receiving a message or data packet to/from another device distributed along bus 3. As will be described in detail in conjunction with FIG. 2, bus 3 may comprise three twisted wire pairs 120, 121, 122, respectively conveying data, clock, and status signals among the devices 1-1 through 1-N along the network. The data itself is preferrably assembled and serially transmitted according to SDLC (synchronous data link communication) protocol over the data portion 120 of the bus 3. When messages are received by a device 1-i they are disassembled by the communication board 3-i of that device and read out to the associated processor 2-i under its control.

The description thus far has been a general explanation of the basic components and operation of a distributed communication network which, for the most part, is conventional. Within such a system however, the procedure and its implementation by way of which use of the bus is determined may vary from system to system and it is this procedure and its implementation to which the present invention is directed. Specifically, the invention concerns itself with a scheme by which one and only one device may obtain control of the bus, so as to prevent the simultaneous transmission of messages resulting in interference, yet provides rapid access to the bus and preestablished retransmission criteria in response to an unforseen inadvertent collision on the bus. This scheme is implemented by a novel half-duplex communication board and associated bus link hardware that substantially reduces the complexity of previous full duplex approaches. A detailed illustration of an individual communication board 3-i is presented in FIG. 2.

Figure 2:
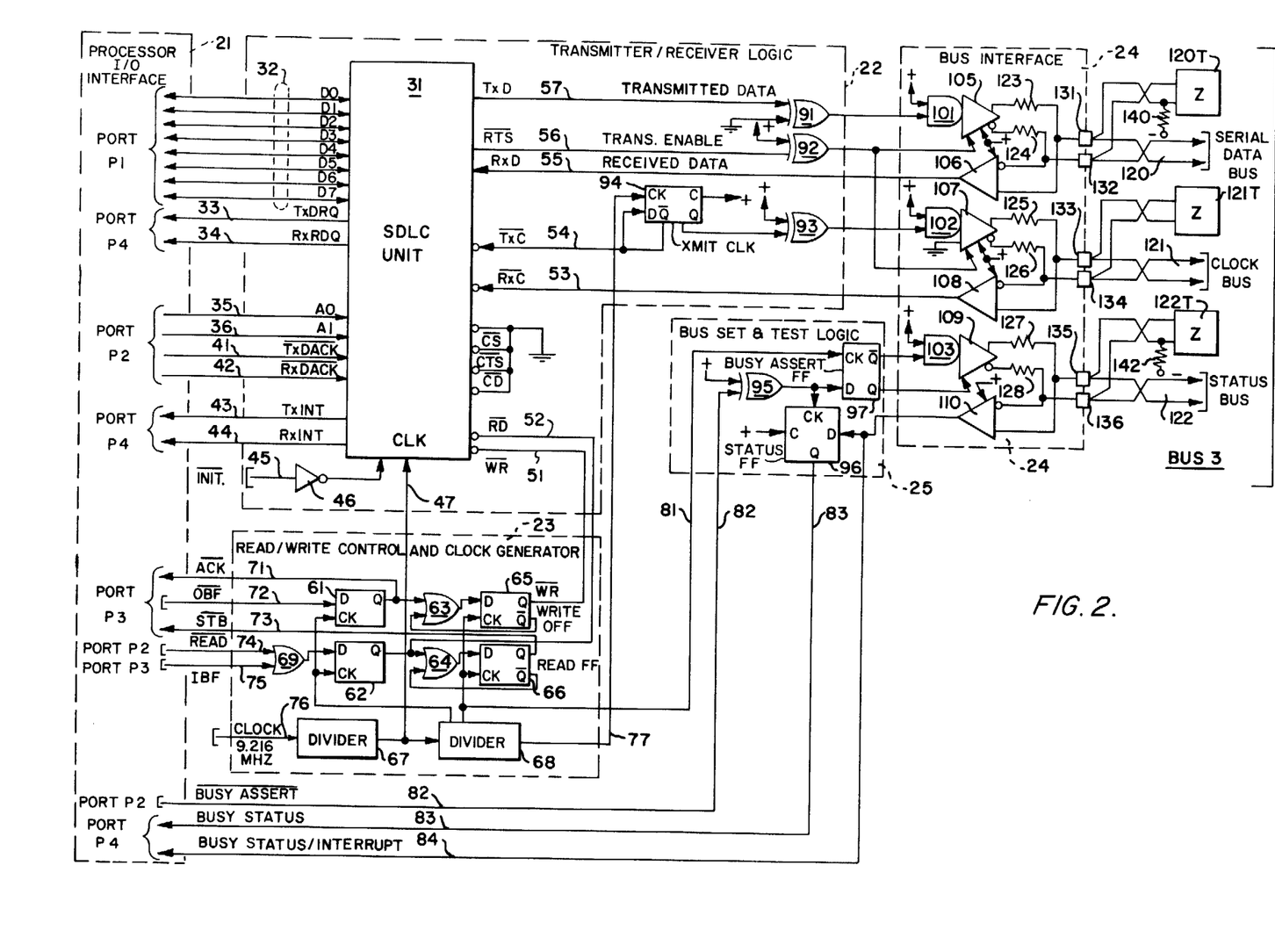
FIG. 2 is a detailed schematic illustration of the component portions of an individual communication board.

As is shown in FIG. 2, each communication board, or bus adapter, contains a computer adapter interface 21 by way of which computer bus adapter signals are exchanged with one another. These signals include the data itself that is serially conveyed over the bus, as well as necessary control, clock, and address signals. The processor itself may consist of any suitable commercially available CPU and associated memory. For this purpose, single board computer hardware manufactured by INTEL and including the INTEL 80/20 processor may be suitably employed.

The ports of interface unit 21 through which the processor, such as the above-referenced INTEL 80/20 processor, is coupled to the communication board are designated in FIG. 2 as ports P1, P2, P3, and P4. Port P1 is a bidirectional data port for eight data lines 32, coupling data bits D0 through D7 to and from the SDLC unit 31. Ports P2 and P3 couple signals for controlling data transfers and the transmitter/receiver logic. Port P3 is also used, together with port P4, to carry out bus busy assertion and test procedures. The action of the individual bits of these ports will be described in detail below in conjunction with the description of the logic and operation of the system.

For controlling the assembly and transmission, reception and disassembly of SDLC protocol serial data messages over the bus, the communication board further includes a transmitter/receiver logic section 22, principally configured of an SDLC unit 31, and additional logic components, including exclusive OR gates 91, 92, and 93 and flip-flop 94. Unit 31 may be a commercially available transceiver chip that converts parallel data D0 through D7 inputs on leads 32 into serial format and assembles a data packet for transmission according to SDLC protocol. For this purpose, an INTEL 8273 programmable protocol controller (PPC) may be used. Pursuant to SDLC convention, each message will consist of leader and tail end eight bit flag bytes (flag byte=01111110) between which are serially formed address, control, data, and frame check sequence fields. An outgoing serial data stream is supplied from the serial data output TxD of unit 31 over line 57 to one input of exclusive OR gate 91, a second input of which is hardwired low. The hardwiring to ground of the second input of exclusive OR gate 91 effectively causes the gate to act as a buffer driver to bus interface 24. Similarly, one input of each of exclusive OR gate 92, 93, and 95 is hardwired to a fixed reference voltage so that these gates also function as buffer drivers to bus interface 24. The output of gate 91 is coupled to AND gate 101 of bus interface unit 24, as shown.

Line 56 from SDLC unit 31 couples a request-to-send signal $\overline{RTS}$ to one input exclusive OR gate 92, a second input of which is hardwired high and the output of which is coupled to enable each of drivers 105 and 107 of bus interface unit 24. Line 55 couples a received serial data stream from driver 106 of bus interface unit 24 to the receive data input RxD of SDLC unit 31. The respective transmitter $\overline{TxC}$ and receiver $\overline{RxC}$ clocks are applied to SDLC unit 31 via lines 54 and 53, respectively. Line 54 is coupled to the D input and Q output of flip-flop 94, the C input of which is hardwired high. The clock input of flip-flop 94 is coupled over line 77 to divider 68 of R/W control and clock generator unit 23. The Q output of flip-flop 94 is coupled to one input of exclusive OR gate 93, a second input of which is hardwired high. The output of gate 93 is coupled to one input of AND gate 102 of bus interface unit 24.

Lines 35 and 36 couple address signals via the control port P2 of the interface unit 21 from the processor for selecting a particular data register in the SDLC unit. Lines 41 and 42 couple transmit $\overline{TxDACK}$ and receive $\overline{RxDACK}$ acknowledgement signals from the processor to the SDLC unit 31. Similarly, lines 43 and 44 couple transmit TxINT or receiver RxINT service requests from the SDLC unit 31 to the processor. The $\overline{TxDACK}$ signal on line 41 is used by the processor to inform the SDLC unit that it has supplied a data byte to the SDLC unit for assembly and transmission. Similarly, the RxDACK signal on line 42 is used by the processor to inform the SDLC unit that it has received and processed a transferred data byte and is ready for an additional byte. Lines 35 and 36 are used in conjunction with lines 41 and 42 for designating data registers in the SDLC unit 31. Lines 33 and 34 couple transmit data request TxDRQ and receive data request RxDRQ signals from the SDLC unit 31 to the processor requesting the transfer of data over port P1 in the appropriate mode (transmit or receive).

Line 45 couples system initialization signals via a Schmitt trigger 46 to reset the SDLC chip, as on power up. Line 47 supplies to clock input CLK a clock signal (e.g. 1.84 MHz) for controlling the rate of operation of unit 31. The actual transfer of data between the processor and SDLC unit 31 is controlled by read and write signals on lines 52 and 51, which are respectively connected between the Q outputs of READ and WRITE flip-flops 62 and 65 and inputs $\overline{RD}$ and $\overline{WR}$ of unit 31. The remaining inputs, i.e. chip select ($\overline{CS}$), send ($\overline{CTS}$), and carrier detect ($\overline{CD}$) of SDLC unit 31 are hardwired to ground, to enable a message transmission to proceed when the SDLC is ready, and to enable both read and write transfer operations by the SDLC unit.

R/W control and clock generator 23 consists essentially of divider and appropriate combinational logic for generating the necessary timing signals governing the operation of the communication board. A system clock signal (e.g. at 9.216 MHz) is applied to the clock input of divider 67 to produce a 1.84 MHz clock signal for operating the SDLC unit 31. This divided signal is, in turn, further reduced in frequency by divider 68 to produce a 920 KHz signal on lead 79, a 460 KHz signal on lead 78, and a 115 KHz signal on lead 77. The 460 KHz frequency clocks flip-flops 61 and 62, while the 920 KHz frequency clocks flip-flops 65, 66, and 97. The D input of flip-flop 61 is coupled via line 72 to control port P3 of interface unit 21 and receives a signal $\overline{OBF}$ as to whether or not the output buffer of the processor is full. The Q output of flip-flop 61 is coupled to one input of OR gate 63 and, via line 71, to control port P3 of interface unit 21. Line 71 supplies a signal $\overline{ACK}$ to acknowledge the latching of the $\overline{OBF}$ signal in flip-flop 61. The output of OR gate 63 is coupled to the D input of WRITE flip-flop 65, the $\overline{Q}$ output of which is coupled to a second input of OR gate 63.

OR gate 69 has first and second inputs coupled to receive read-out control $\overline{READ}$ and input buffer full IBF control signals over lines 74 and 75 from control ports P2 and P3 of processor I/O interface unit 21. The output of OR gate 69 is coupled to the D input of flip-flop 62, the Q output of which is coupled to line 52 and one input of OR gate 64. The output of OR gate 64 is coupled to the D input of READ flip-flop 66, the Q output of which is coupled to lead 73 for supplying a read strobe signal $\overline{STB}$ to the processor, so that data can be strobed from a data register in SDLC unit 31 to the input buffer of the processor. The Q output of READ flip-flop 66 is coupled to a second input of OR gate 64.

The communication board is further comprised of a bus interface unit 24, consisting of three sets of bidirectional driver pairs 105–106, 107–108, and 109–110. The inputs to transmit-output drivers 105, 107, and 109 are derived via AND gates 101, 102, and 103, respectively. The magnitudes of the output signals from drivers 105, 107, and 109 are reduced by resistors 123 through 128 for proper signal level coupling and for reducing reflections along the bus. The outputs of drivers 105, 107, and 109, and the inputs of drivers 106, 108, and 110 are coupled via junctor connectors 131 through 136 to serial data bus 120, clock bus 121, and status bus 122 which make up the system bus. Each of individual buses 120 through 122 of the system bus 3 may comprise a suitable twisted wire pair, as shown schematically in FIG. 2, with an appropriate resistor terminator pad 120T, 212T, 122T coupled to junctor connectors 131 through 136 for proper impedance matching. Resistors 140 and 142 are coupled between a source of bias potential and one of the leads leading to respective terminating pads 120T and 122T, so as to effectively bias the serial data bus and the status bus to a prescribed binary state, representative of a bus unoccupied condition. This bias prevents the bus from floating, so that when the bus is free, a requesting device will not observe a false busy condition.

With the bus interface unit 24 and system bus 3, proper, configured as described above and shown in FIG. 2, the serial SDLC data stream is transmitted over serial data bus 120, while the transmitter and receiver clocks are coupled over clock bus 121. The status bus 122 is employed in conjunction with the bus set and test logic, to be described below, for establishing exclusive access to the bus and thereby avoiding collisions on the bus.

More particularly, in order to implement the bus flag setting and busy test procedures according to the present invention, the communication board further contains a bus set and test logic unit 25. Included in this unit are an exclusive OR gate 95, one input of which is hardwired high and the other input of which is coupled via line 82 to control port P2 of interface unit 21. Line 82 is used to supply a $\overline{BUSY\ ASSERT}$ signal from the processor so as to set a bus busy flag or semaphore whenever the processor wishes to transmit. The output of exclusive OR gate 95 is coupled to the D input of BUSY ASSERT flip-flop 97, the clock input CK of which is coupled via line 81 to divider 68. The Q output of BUSY ASSERT flip-flop 97 is coupled to enable BUSY FLAG driver 109, while the $\overline{Q}$ output of BUSY ASSERT flip-flop 97 is coupled to AND gate 103. The output of exclusive OR gate 95 is further coupled to the clock input of STATUS flip-flop 96. The D input of STATUS flip-flop 96 is coupled to the output of STATUS BUS MONITOR driver 110, while the C input is hardwired high. The Q output of STATUS flip-flop 96 is coupled over line 83 to control port P4 of processor I/O interface unit 21. The output of STATUS BUS MONITOR driver 110, indicative of whether or not another device in the system has seized the bus, is further coupled over line 84 to control port P4 of processor I/O interface unit 21, as a BUSY STATUS/INTERRUPT signal, so that the processor may prepare itself to receive a message whenever the bus is seized by another device. It should be recalled that the present system is a half-duplex system, thereby reducing expensive and complex hardware and is normally in the receive mode when not transmitting, so that it does not miss a message intended for it. The logic level on line 83 indicates whether a busy flag has been raised by another device in the system at the time the device under consideration wishes to transmit. Should it be desired to place a communication board in a receive only mode, BUSY STATUS line 83 may be appropriately strapped to a bus busy logic level.

Having described the circuitry components and interconnections making up the communications board shown in FIG. 2, the operation of the communications board and that of the overall system will now be explained.

TRANSMISSION MODE

As was explained above, and as is clear from FIG. 2, the transmission of messages is effected by transmitter/receiver logic unit 22 containing SDLC unit 31, the data and control inputs of which are derived from the CPU via interface unit 21. When a message is to be transmitted, various fields are assembled by the SDLC unit 31 with sequences of eight-bit data bytes supplied from the processor data port P1 over parallel lines 32. During transmission, data is written from the CPU output buffer into an appropriate buffer or register of the SDLC unit 31. For each new byte a transmit data request signal TxDRQ is coupled from SDLC unit 31 over line 33 to the processor. A write cycle is initiated once data is placed in the processor's output buffer for delivery to the DATA port P1 of interface unit 21. The necessary register address and transmit acknowledge control signals are supplied over lines 35, 36, and 41 to SDLC unit 31, to prepare SDLC unit 31 to receive data from the processor.

Figure 3:
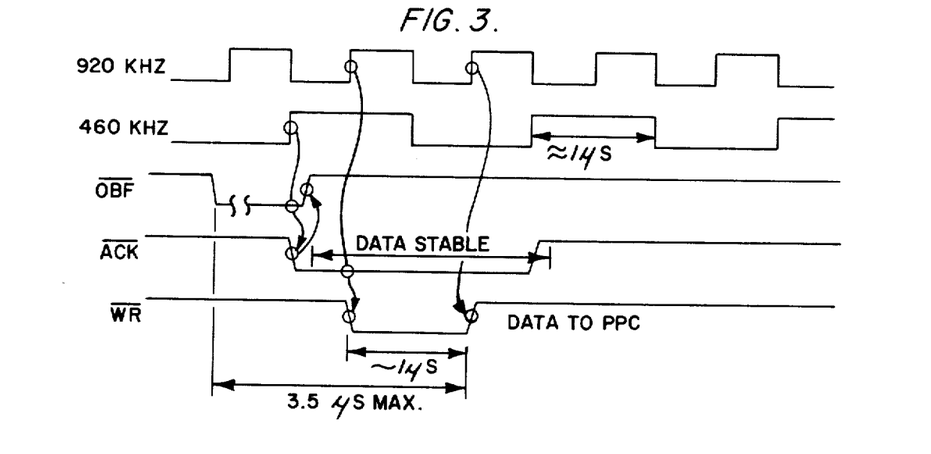
FIGS. 3, 4, and 5 are timing diagrams relating to the data writing, busy assertion and test, and data read-out operations of the communications board shown in FIG. 2.

Referring now to FIG. 3, which illustrates a timing diagram of the write operation of the R/W control and clock generator 23, to initiate a write operation, the processor causes the OBF level on line 72 to go low. At the next 460 KHz clock transition (low-to-high) the Q output of flip-flop 61 goes low, following the D input, so that the $\overline{ACK}$ level on line 71 goes low at this time. In response to this $\overline{ACK}$ signal, the processor places a data byte, via the data port P1, on leads 32, so that data is ready to be strobed or written into the appropriate register of the SDLC chip as designated by the A0, A1 bits. Acknowledgement of the transfer by the processor and that another data byte is available for transfer is coupled over line 41.

Within the processor the $\overline{OBF}$ level is reset by the $\overline{ACK}$ signal. At the next positive transition of the 920 KHz clock signal, the Q output of WRITE flip-flop 65 goes low, so that a low $\overline{WR}$ signal is applied to WRITE (WR) input of the SDLC unit 31. This write signal causes the data to be strobed from lines 32 into the addressed register of the SDLC unit. The next positive transition of the 920 KHz clock toggles WRITE flip-flop 65 to its opposite state, thereby terminating the $\overline{WR}$ pulse. At the next positive transition of the 460 KHz clock, the Q output of flip-flop 61 goes high, thereby terminating a write cycle. This write procedure is repeatedly conducted as data is strobed from the processor, assembled by SDLC chip, and serialized out over lead 57 during message assembly and transmission.

As was explained previously, the serial data transmission of an SDLC message is controlled by a signal on line 56 which, via gate 92, enables driver 105, so that a message can be placed on the bus. When a message is sent out on the bus, the SDLC frame is coupled from line 57, via gate 91 and driver 105, to serial data bus 120 of bus 3. Prior to transmission, however, the busy flag setting and status testing procedures are carried out.

BUS FLAG SET AND STATUS TEST

Figure 6:
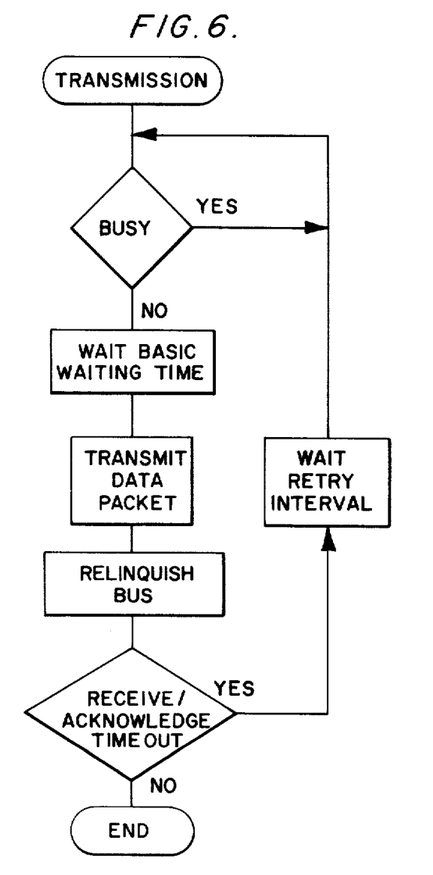
FIGS. 6 and 7 are respective flow charts of the message transmission and message receipt acknowledgement operations embodied in a message communication between respective devices along the distributed network.

A flow chart of the sequence of operations conducted for a transmission, from busy assert and test to reception of an acknowledgement message is shown in FIG. 6, and reference may be had thereto during the description below for a pictorial sequence of the described system operation.

Figure 4:
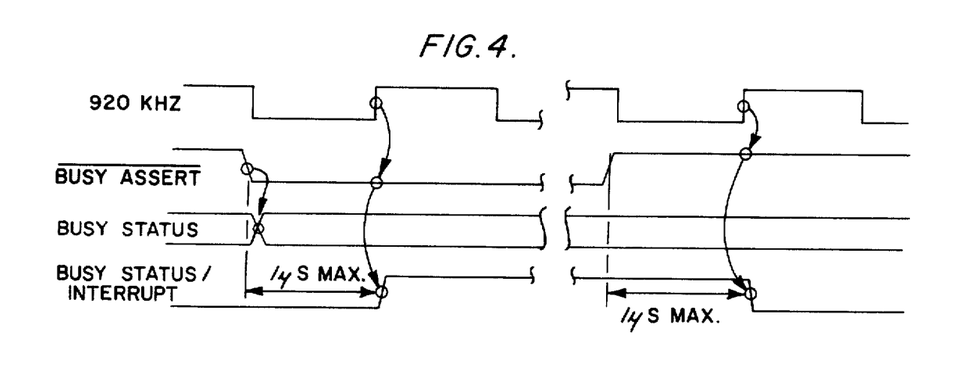
Figure 5:
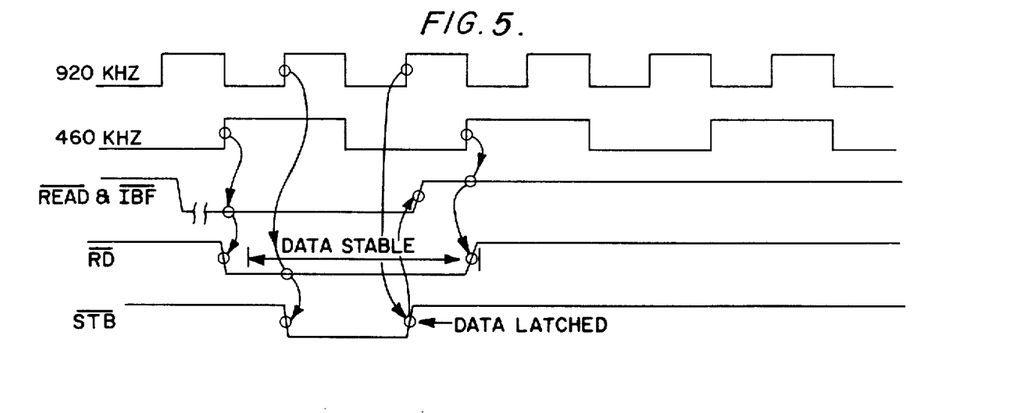

Prior to transmitting a message, and obeying the collision avoidance procedure established in accordance with the present invention, the processor asserts a busy condition of the status bus by causing the level on BUSY ASSERT line 82 to go low, as shown in the timing diagram of FIG. 4. This causes the output of exclusive OR gate 95 to go high. At the next transition of the 920 KHz clock on line 81 from divider 68, BUSY ASSERT flip-flop 97 is toggled, to cause a busy condition level to be placed on the status bus 122. The transition at the output of exclusive OR gate 95 has also triggered STATUS flip-flop 96, to cause its Q output to supply a level over line 83 indicative of the output of STATUS BUS MONITOR driver 110, namely, the status of the bus immediately prior to the 920 KHz clock placing a busy flag on the status bus. The delay between the immediate triggering of STATUS flip-flop 96, which reads the status bus 122, and the latching of BUSY ASSERT flip-flop 97 by the 920 KHz transition prevents STATUS flip-flop 96 from reading the busy flag raised by its own processor. At all times, the actual busy or non-busy condition of status bus 122 is monitored by the processor via BUSY STATUS/INTERRUPT line 84. The processor monitors this line, so that it will be informed of other devices sending messages, and any message addressed to it from another device will not be missed. This feature is significant, since the system is half-duplex, in which there is no simultaneous transmission and reception of messages by the same device.

Assuming that the bus has not been seized by any other device, then the Q output of STATUS flip-flop 96 will have indicated that the bus is free, so that transmission from the SDLC unit 31 of the communication board can proceed. Thereafter, the above-described write and transmit-out cycles through the SDLC unit 31 commense and a data packet (one SDLC frame) is strobed onto the serial data bus 120, while the transmitter clock is coupled over clock bus 121.

After the message has been transmitted onto the bus, the sending device removes its busy flag from STATUS BUS 122 and waits to receive an expected acknowledgement message or data packet from the device to whom the message was addressed. For this purpose, upon the expiration of a brief bus propagation time-out interval after the end flag byte is transmitted, the processor changes the level of the BUSY ASSERT line 82 from low to high, so that the output of exclusive OR gate 95 changes from high to low. At the next 920 KHz clock pulse on line 79, the state of BUSY ASSERT flip-flop 97 is changed and the busy flag placed by driver 109 on the STATUS BUS is removed. The device receiving the data packet can now send back an acknowledgement message to the original transmitting device. Before describing the acknowledgement procedure, the operation of the communication board in the receive mode will be explained.

RECEIVE MODE

As has been described previously, the communication board is half-duplex. As a result, when not transmitting, each device monitors the status bus 122 for a busy flag set by another device. This action is achieved through the use of the BUSY STATUS/INTERRUPT line 84. When the processor of a device observes a busy flag raised on line 84, it immediately prepares itself to read data contained in a message that may be addressed to it. In this mode, as the message is transmitted over the serial data bus 120, it is coupled via driver 106 over line 55 to the receive data input RxD of the SDLC unit 31 of the receiving communication board. Synchronously therewith, the transmitted clock is coupled through driver 108 over line 53 to the receiver clock input RxC of SDLC unit 31. Assuming that the SDLC unit 31 recognizes its address in the SDLC address byte, it forwards a receive interrupt signal RxINT on line 44 and a receive data read request signal RxDRQ on line 34 to the processor, so that incoming data may be read out over the data port P1, via parallel data lines 32 and latched into the input buffer of the processor.

In response to a receive data request signal RxDRQ, the processor causes each successively received data byte that is placed on lines 32 to be read out through the processor I/O interface data port P1 and strobed into the processor input buffer. This action is initiated by a READ signal over line 74 from the control port P2 to OR gate 69. In addition, each time the processor reads the data port P1, it places a low level state on the IBF (input buffer full) line 75, to indicate to peripheral equipment that the data has been read by the processor. Since an IBF low on line 75 would begin another read cycle, the $\overline{\text{READ}}$ control line is used to hold the read cycle. With reference to FIG. 4, upon the next 460 KHz positive transition, the Q output of flip-flop 62 goes low, so that the $\overline{\text{RD}}$ line 52 goes low and the data in the appropriate data register in the SDLC unit 31 is applied to lines 32 and coupled via data port P1 to the input buffer of the processor.

The low state of the Q output flip-flop 62 is coupled through OR gate 64, so that the Q output of READ flip-flop 66 goes low at the next low-to-high transition of the 920 KHz clock signal, as shown in FIG. 4. This output is used to strobe the data on lines 32 at the interphase data port P1 into the processor via $\overline{\text{STB}}$ line 73. With the data byte now latched in the input buffer the IBF line 75 goes high. Through line 42 a received data acknowledge signal $\overline{\text{RxDACK}}$ is supplied from port P2, so that the SDLC unit is informed that the strobed data byte has been taken by the processor. Once the data has been cleared from the processor input buffer, the IBF and $\overline{\text{READ}}$ lines again go low so that new read cycle can commense.

ACKNOWLEDGEMENT MESSAGE

Figure 7:
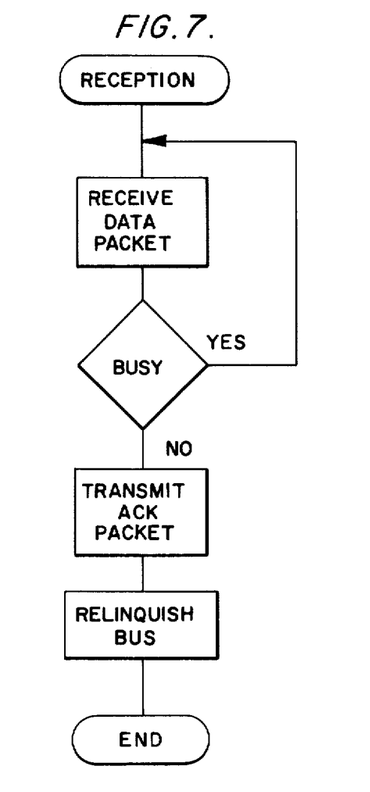

A flow chart of the sequence of operations conducted for a reception and acknowledgement is shown in FIG. 7, and reference may be had thereto during the following description for a pictorial sequence of the described system operation.

After the entire message has been received and read out by the SDLC unit 31, the receiving device then seizes the bus and transmits an acknowledgement message back to the original transmitting device. For this purpose, the receiver proceeds to carry out a bus busy assert and status test, followed by the transmission of a data packet in accordance with the same procedure described above. In comparison with the length of the originally transmitted data packet, however, the length of an acknowledgement data packet may be very short, with a prescribed code being used as an acknowledgement indication. It goes without saying that an acknowledgement message is strictly used for this purpose and does not prompt any response from the transmitter. (There is no acknowledgement of an acknowledgement.) At the original transmitter, once an acknowledgement data packet is received, it knows that its message got through and it can then proceed to send any further data packets, following the above-described procedure for each transmission. If an acknowledgement message is not received within a prescribed time interval (determined by the processor), the message originating device assumes that a collision has occurred and proceeds to retransmit the message, again following the busy assert, test, and transmission procedure described above. The occurrence of a collision will be described next.

BUS COLLISION

As was outlined briefly above, when a device desires to transmit, its processor immediately changes the level of the BUSY ASSERT line 82, so that upon the next 920 KHz pulse, BUSY ASSERT flip-flop 97 will cause a busy flag to be placed on status bus 122. At the same time that the BUSY ASSERT line 82 goes low, STATUS flip-flop 96 reads the present condition of the status bus 122 (before BUSY ASSERT flip-flop 97 causes a busy flag to be raised). Although the probability of simultaneous requests for service and bus seizure are extremely small, it may happen that more than one device is proceeding with a busy assert and test operation at the same time. Because of circuit operation time and propagation delays along the bus, one device may have begun its own busy assert and status test operations and found the bus free, without being aware that the same action is being taken by another device at the same time. When each device finds the bus free it will proceed to transmit a message formulated according to the SDLC protocol, as described above. Once on the bus, however, these two data packets from respectively different transmitting devices will collide and thereby interfere with one another. As a result, even though the other devices distributed along the network will have been alerted to the fact that the bus has been seized and a message for someone is being transmitted, the colliding messages will result in a garbled transmission and no device will capture and acknowledge a data packet from either of the transmitting devices. Therefore, for each transmitting device, after a prescribed time period during which an acknowledgement data packet has not been received, its processor will assume that a collision has occurred and will proceed to retransmit the message. For this purpose, after a time-out action, the processor contained in each device will commense to reassert bus busy, test the status line and, if clear, transmit. To prevent a recollision between the messages of the participants of the original collision, within memory for each processor there is stored a retransmission attempt time or schedule that effectively establishes priority among all the devices distributed along the network. The schedule is such that each device distributed along the network is assigned a different retransmission time. The time intervals assigned to and stored in each processor are sufficient to encompass the maximal message length of a data packet and receipt of an acknowledgement message. However, the intervals differ from one another by a prescribed priority defining differential, so that, in the event of a collision, the retransmit time of a lower priority device will be slightly delayed relative to that of a higher priority device, so that the lower priority device cannot seize the bus. Thus, after failing to receive and acknowledge a message, the processor of each collision causing device will assert a bus busy condition on line 81 according to its particular assigned retransmission attempt schedule. Because of this fixed priority scheme among all the devices in the system, the device having the higher priority will assert a busy flag at a time sufficiently in advance of the assertion of the busy flag by the lower priority device so as to prevent a bus collision between these devices. Namely, when the STATUS flip-flop 96 of the lower priority device reads the status bus 122, it will see that the bus has been seized (by the higher priority device), whereby no transmission from the lower priority device will proceed, until the bus becomes free.

It is possible (although very unlikely) that, during the retransmission busy assert and status bus test by the higher priority device, another device, not involved in the previous collision, may assert the busy flag and conduct a busy test procedure at the same time that the higher priority device is conducting this procedure prior to its retransmission. This would lead to a new collision between the original higher priority device and the newly attempting-to-transmit device. In such an event, the same time-out, prioritizing, and retransmission procedure between the new collision participants is carried out. This sequence ensures that any inadvertent collision is circumvented and each device desiring to transmit may attempt to do so at any time. This asynchronous approach affords a maximal efficient use of the bus without a substantial investment in expensive and complex communication hardware; yet, it provides a collision safeguard through an initial busy assert and testing procedure which effectively avoids bus interference. A major objective of the system is to maximize use of the bus by immediately granting access to the bus (if it is idle) to a device desiring to transmit. The bus assert and busy test procedure through a considerably simplified hardware scheme is a practical technique for accomplishing this objective. Moreover, even though extremely unlikely, an unforseeable bus collision may occur; yet successful completion of the desired transmission is guaranteed by an acknowledgement, retransmission procedure that, vis-a-via the collision-causing participants, is priority-based, to guarantee the success of the bus assert and status test procedure of the higher priority device relative to the lower priority device.

Through this technique, bus occupancy is essentially awarded on a first come, first served basis. Assigned priority is only used in the event of a collision, which, because of its rate occurrence, permits housekeeping by the communication boards to be substantially reduced.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. In a digital data communication network wherein a plurality of processor devices are indirectly coupled to a communication bus over which messages between respective devices are transmitted, a system for preventing simultaneous transmission of messages by plural ones of said devices and thereby avoiding a transmission collision on said bus comprising:

first means, coupled with a respective device and responsive to a request for a transmission from its processor, for causing a bus seizure representative signal to be placed on said bus and to thereby be supplied to each of the devices coupled to the bus;

second means, coupled to said bus and coupled to and responsive to the operation of said first means, for examining said bus for the presence of a bus seizure representative signal that has been placed on the bus by another device; and third means, coupled to said second means, said bus and said device, for causing said device to transmit a message over said bus in response to said second means finding that no bus seizure signal has been placed on the bus by another device, but otherwise inhibiting said device from proceeding with the transmission of a message.

2. A system according to claim 1, wherein said third means includes means for monitoring said bus for the return of an acknowledgement message from the device to which the transmitted message was transmitted, indicative of the receipt of the transmitted message thereby, and causing the operation of said first, second, and third means to be repeated in response to a lack of said return of said acknowledgement message within a prescribed interval of time.

3. A system according to claim 2, wherein said third means includes means for causing the operation of said first, second, and third means to be repeated at a time unique to said device and different from that of each other device in the system.

4. A system according to claim 1, wherein said bus comprises:

a serial data bus over which messages between devices are transmitted in serial format;

a clock bus for coupling the transmission timing between devices; and a busy status bus to which each of said first and second means is commonly connected and on which said bus seizure representative signal is placed.

5. A system according to claim 1, wherein said first means includes:

means, responsive to a request for a transmission from the processor of the device with which said first means is associated, for generating said bus seizure representative signal; and means for delaying the placing of said bus seizure representative signal on said bus a period of time sufficient for said second means to examine said bus for said presence of a bus seizure representative signal that has been placed on the bus by another device.

6. A system according to claim 5, wherein said second means includes means, responsive to the bus seizure representative signal from said generating means, for examining said bus for said presence of a bus seizure representative signal that has been placed on the bus by another device.

7. A system according to claim 4, wherein said first means includes:

means, responsive to a request for a transmission from the processor of the device with which said first means is associated, for generating said bus seizure representative signal; and means for delaying the placing of said bus seizure representative signal on said bus a period of time sufficient for said second means to examine said bus for said presence of a bus seizure representative signal that has been placed on the bus by another device.

8. A system according to claim 7, wherein said second means includes means, responsive to the bus seizure representative signal from said generating means, for examining said bus for said presence of a bus seizure representative signal that has been placed on the bus by another device.

9. A system according to claim 4, wherein said third means includes means for monitoring said bus for the return of an acknowledgement message from the device to which the transmitted message was transmitted, indicative of the receipt of the transmitted message thereby, and causing the operation of said first, second, and third means to be repeated in response to a lack of said return of said acknowledgement message within a prescribed interval of time.

10. A system according to claim 9, wherein said third means includes means for causing the operation of said first, second, and third means to be repeated at a time unique to said respective device and different from that of each other device in the system.

11. A system according to claim 7, wherein said third means includes means for monitoring said bus for the return of an acknowledgement message from the device to which the transmitted message was transmitted, indicative of the receipt of the transmitted message thereby, and causing the operation of said first, second, and third means to be repeated in response to a lack of said return of said acknowledgement message within a prescribed interval of time.

12. A system acccording to claim 11, wherein said thrid means includes means for causing the operation of said first, second, and third means to be repeated at a time unique to said device and different from that of each other device in the system.

13. A system according to claim 4, wherein said communication network is a distributed digital data communication network and wherein each of said devices transmits and receives messages over said data bus in a half-duplex mode of operation.

14. In a digital data communication network wherein a plurality of processor devices are indirectly coupled to a communication bus over which messages between respective devices are transmitted, a method for preventing simultaneous transmission of messages by plural ones of said devices and thereby avoiding a transmission collision on said bus comprising the steps of:
 (a) at a respective device and in response to a request for a transmission from its processor, causing a bus seizure representative signal to be placed on said bus and to thereby be supplied to each of the devices coupled to the bus;
 (b) examining said bus, in response to step (a), for the presence of a bus seizure representative signal that has been placed on the bus for another device; and
 (c) causing said respective device to transmit a message over said bus in response to step (b) indicating that no bus seizure signal has been placed on the bus for another device, but otherwise inhibiting said respective device from proceeding with the transmission of a message.

15. A method according to claim 14, wherein step (c) includes the steps of:
 (c1) monitoring said bus for the return of an acknowledgement message, from the device to which the transmitted message was transmitted, indicative of the receipt of the transmitted message thereby; and
 (c2) repeating steps (a) through (c) in response to a lack of said return of said acknowledgement message within a prescribed interval of time.

16. A method according to claim 15, wherein step (c2) includes the step of repeating steps (a) through (c) at a time unique to said device and different from that of each other device in the system.

17. A method according to claim 14, wherein said bus comprises:
 a serial data bus over which messages between devices are transmitted in serial format,
 a clock bus for coupling the transmission timing between devices, and
 a busy status bus on which said bus seizure representative signal is placed.

18. A method according to claim 14, wherein step (a) includes the steps of
 (a1) in response to a request for a transmission from the processor of the device desiring to transmit, generating said bus seizure representative signal, and
 (a2) delaying the placing of said bus seizure representative signal on said bus a period of time sufficient for the completion of step (b) to examine said bus for said presence of a bus seizure representative signal that has been placed on the bus for another device.

19. A method according to claim 18, wherein step (b) includes the step of:
 in response to the bus seizure representative signal generated by step (a1), examining said bus for said presence of a bus seizure representative signal that has been placed on the bus for another device.

20. A method according to claim 17, wherein step (a) includes the steps of
 (a1) in response to a request for a transmission from the processor of the device desiring to transmit, generating said bus seizure representative signal, and
 (a2) delaying the placing of said bus seizure representative signal on said bus a period of time sufficient for the completion of step (b) to examine said bus for said presence of a bus seizure representative signal that has been placed on the bus for another device.

21. A method according to claim 20, wherein step (b) includes the step of:
 in response to the bus seizure representative signal generated by step (a1), examining said bus for said presence of a bus seizure representative signal that has been placed on the bus for another device.

22. A method according to claim 17, wherein step (c) includes the steps of:
 (c1) monitoring said bus for the return of an acknowledgement message from the device to which the transmitted message was transmitted, indicative of the receipt of the transmitted message thereby; and
 (c2) repeating steps (a) through (c) in response to a lack of said return of said acknolwedgement message within a prescribed interval of time.

23. A method according to claim 22, wherein step (c2) includes the step of repeating steps (a) through (c) at a time unique to said respective device and different from that of each other device in the system.

24. A method according to claim 20, wherein step (c) includes the steps of:
 (c1) monitoring said bus for the return of an acknowledgement message from the device to which the transmitted message was transmitted, indicative of the receipt of the transmitted message thereby; and
 (c2) repeating steps (a) through (c) in response to a lack of said return of said acknowledgement message within a prescribed interval of time.

25. A method according to claim 24, wherein step (c2) includes the step of repeating steps (a) through (c) at a time unique to said device and different from that of each other device in the system.

26. A method according to claim 17, wherein said communication network is a distributed digital data communication network and wherein each of said devices transmits and receives messages over said data bus in a half-duplex mode of operation.

27. In a digital data communication network wherein a plurality of devices are indirectly coupled to a communication bus over which messages between respective devices are transmitted, a system for preventing simultaneous transmission of messages by plural ones of said devices and thereby avoiding a transmission collision on said bus comprising:
   first means, coupled with a respective device and in preparation for a transmission of a message, for causing a bus seizure representative signal to be placed on said bus and to thereby be supplied to each of the devices coupled to the bus;
   second means, coupled to said bus and responsive to the operation of said first means, for examining said bus for the presence of a bus seizure representative signal that has been placed on the bus by another device; and
   third means, coupled to said second means, said bus and said device, for causing said respective device to transmit a message over said bus in response to said second means finding that no bus seizure signal has been placed on the bus by another device, but otherwise inhibiting said respective device from proceeding with the transmission of a message.

28. A system according to claim 27, wherein said third means includes means for monitoring said bus for the return of an acknowledgement message from the device to which the transmitted message was transmitted, indicative of the receipt of the transmitted message thereby, and causing the operation of said first, second, and third means to be repeated in response to a lack of said return of said acknowledgement message within a prescribed interval of time.

29. A system according to claim 28, wherein said third means includes means for causing the operation of said first, second, and third means to be repeated at a time unique to said respective device and different from that of each other device in the system.

30. A system according to claim 27, wherein said bus comprises:
   a data bus over which messages between devices are transmitted;
   a clock bus for coupling the transmission timing between devices; and
   a busy status bus to which each of said first and second means is commonly connected and on which said bus seizure representative signal is placed.

31. A system according to claim 27, wherein said first means includes:
   means, responsive to a request for a transmission applied thereto, for generating said bus seizure representative signal; and
   means for delaying the placing of said bus seizure representative signal on said bus a period of time sufficient for said second means to examine said bus for said presence of a bus seizure representative signal that has been placed on the bus by another device.

32. A system according to claim 31, wherein said second means includes means, responsive to the bus seizure representative signal from said generating means, for examining said bus for said presence of a bus seizure representative signal that has been placed on the bus by another device.

33. A system according to claim 30, wherein said communication network is a distributed digital data communication network and wherein each of said devices transmits and receives messages over said data bus in a half-duplex mode of operation.

34. In a digital data communication network wherein a plurality of devices are indirectly coupled to a communication bus over which messages between respective devices are transmitted, a method for preventing simultaneous transmission of messages by plural ones of said devices and thereby avoiding a transmission collision on said bus comprising the steps of:
   (a) at a respective device and in preparation for a transmission of a message, causing a bus seizure representative signal to be placed on said bus and to thereby be supplied to each of the devices coupled to the bus;
   (b) examining said bus, in response to step (a), for the presence of a bus seizure representative signal that has been placed on the bus for another device; and
   (c) causing said respective device to transmit a message over said bus in response to step (b) indicating that no bus seizure signal has been placed on the bus for another device, but otherwise inhibiting said respective device from proceeding with the transmission of a message.

35. A method according to claim 34, wherein step (c) includes the steps of:
   (c1) monitoring said bus for the return of an acknowledgement message, from the device to which the transmitted message was transmitted, indicative of the receipt of the transmitted message thereby; and
   (c2) repeating steps (a) through (c) in response to a lack of said return of said acknowledgement message within a prescribed interval of time.

36. A method according to claim 35, wherein step (c2) includes the step of repeating steps (a) through (c) at a time unique to said device and different from that of each other device in the system.

37. A method according to claim 34, wherein said bus comprises:
   a data bus over which messages between devices are transmitted,
   a clock bus for coupling the transmission timing between devices, and
   a busy status bus on which said bus seizure representative signal is placed.

38. A method according to claim 34, wherein step (a) includes the steps of:
   (a1) in response to a request for a transmission, generating said bus seizure representative signal, and
   (a2) delaying the placing of said bus seizure representative signal on said bus a period of time sufficient for the completion of step (b) to examine said bus for said presence of a bus seizure representative signal that has been placed on the bus for another device.

39. A method according to claim 38, wherein step (b) includes the step of:
   in response to the bus seizure representative signal generated by step (a1), examining said bus for said presence of a bus seizure representative signal that has been placed on the bus for another device.

* * * * *